(12) United States Patent
Danley

(10) Patent No.: US 10,052,982 B1
(45) Date of Patent: Aug. 21, 2018

(54) RECLINING CHILD CAR SEAT

(71) Applicant: Grace Danley, Crossville, TN (US)

(72) Inventor: Grace Danley, Crossville, TN (US)

( * ) Notice: Subject to any disclaimer, the term of this patent is extended or adjusted under 35 U.S.C. 154(b) by 42 days.

(21) Appl. No.: 15/351,489

(22) Filed: Nov. 15, 2016

(51) Int. Cl.
  *A47C 1/08* (2006.01)
  *A47D 1/10* (2006.01)
  *B60N 2/28* (2006.01)

(52) U.S. Cl.
  CPC ......... *B60N 2/2878* (2013.01); *B60N 2/2812* (2013.01); *B60N 2/2851* (2013.01)

(58) Field of Classification Search
  CPC .. B60N 2/2878; B60N 2/2812; B60N 2/2851; B60N 2/2875; B60N 2/28; B60N 2/26
  USPC ........ 297/256.1, 250.1, 362, 256.13, 344.11, 297/362.11, 362.1
  See application file for complete search history.

(56) References Cited

U.S. PATENT DOCUMENTS

| | | | |
|---|---|---|---|
| D294,310 S | 2/1988 | Wise | |
| 5,286,085 A * | 2/1994 | Minami | B60N 2/2821 297/216.16 |
| 6,739,659 B2 | 5/2004 | Dukes | |
| 6,871,908 B2 * | 3/2005 | Takizawa | B60N 2/2812 297/216.11 |
| 8,007,043 B1 * | 8/2011 | Vuong | B60N 2/28 297/217.3 |
| 8,251,446 B1 * | 8/2012 | Guerrido | A47D 1/002 297/250.1 |
| 8,632,124 B2 | 1/2014 | Clement | |
| 9,039,083 B2 * | 5/2015 | Clement | B60N 2/2821 297/256.13 |
| 9,061,611 B2 * | 6/2015 | Love | B60N 2/2887 |
| 2003/0151282 A1 * | 8/2003 | Williams | B60N 2/2851 297/250.1 |
| 2007/0207870 A1 | 9/2007 | Armbruster | |
| 2008/0061612 A1 | 3/2008 | Crampton | |
| 2012/0280540 A1 | 11/2012 | Pedraza | |
| 2013/0088057 A1 * | 4/2013 | Szakelyhidi | B60N 2/2806 297/250.1 |
| 2014/0008952 A1 * | 1/2014 | Spence | B60N 2/265 297/256.1 |
| 2015/0262134 A1 | 9/2015 | Daley | |
| 2016/0207497 A1 * | 7/2016 | Seal | B60R 22/105 |
| 2016/0304004 A1 * | 10/2016 | Sandbothe | A47D 13/00 |

* cited by examiner

*Primary Examiner* — Mark R Wendell

(74) *Attorney, Agent, or Firm* — Kyle A. Fletcher, Esq.

(57) ABSTRACT

The reclining child car seat is a child safety seat. The reclining child car seat comprises a reclining mechanism that reclines the reclining child car seat in a manner that allows a child to sleep while secured within the reclining child car seat. The reclining mechanism is motor operated. The reclining mechanism is remote controlled. The reclining child seat comprises a seat and a reclining mechanism. The reclining mechanism further comprises a linkage and a control system. The linkage is a structure that: 1) attaches the seating portion of the reclining child car seat to an automobile; and 2) controls the position of the seating portion of the reclining child car seat. The control system adjusts the position of the seating portion of the reclining child car seat.

15 Claims, 7 Drawing Sheets

RECLINING CHILD CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of passenger accommodations in vehicles, more specifically, a seat for children that can be wholly or partially reclined.

SUMMARY OF INVENTION

The reclining child car seat is a child safety seat that is adapted for use in an automobile. The reclining child car seat comprises a reclining mechanism that reclines the reclining child car seat in a manner that allows a child to sleep while secured within the reclining child car seat. The reclining mechanism is motor operated. The reclining mechanism is remote controlled.

These together with additional objects, features and advantages of the reclining child car seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the reclining child car seat in detail, it is to be understood that the reclining child car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reclining child car seat.

It is therefore important that the claims be regarded as including such equivalent construction insofar as they do not depart from the spirit and scope of the reclining child car seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
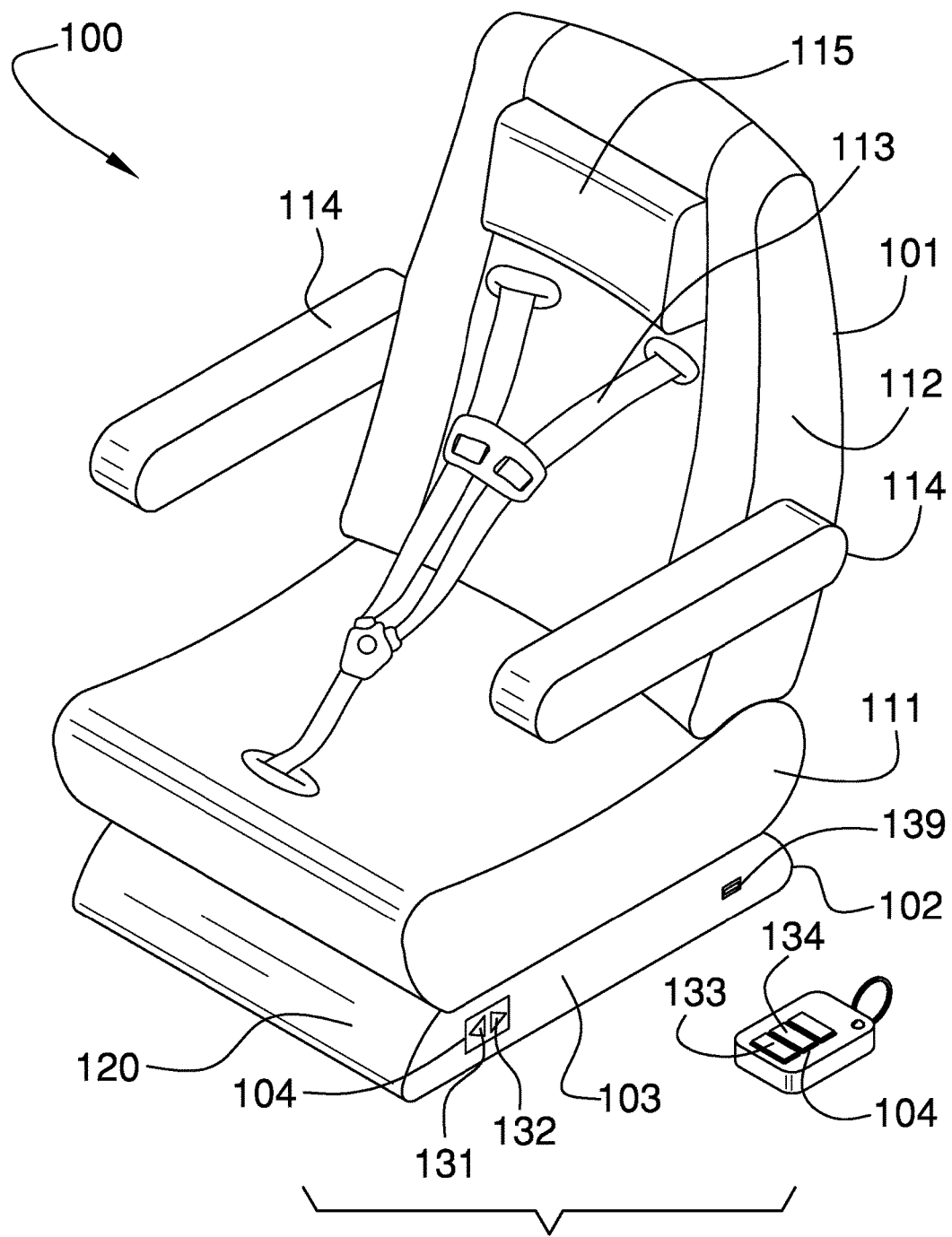
FIG. 1 is a perspective view of an embodiment of the disclosure.
Figure 2:
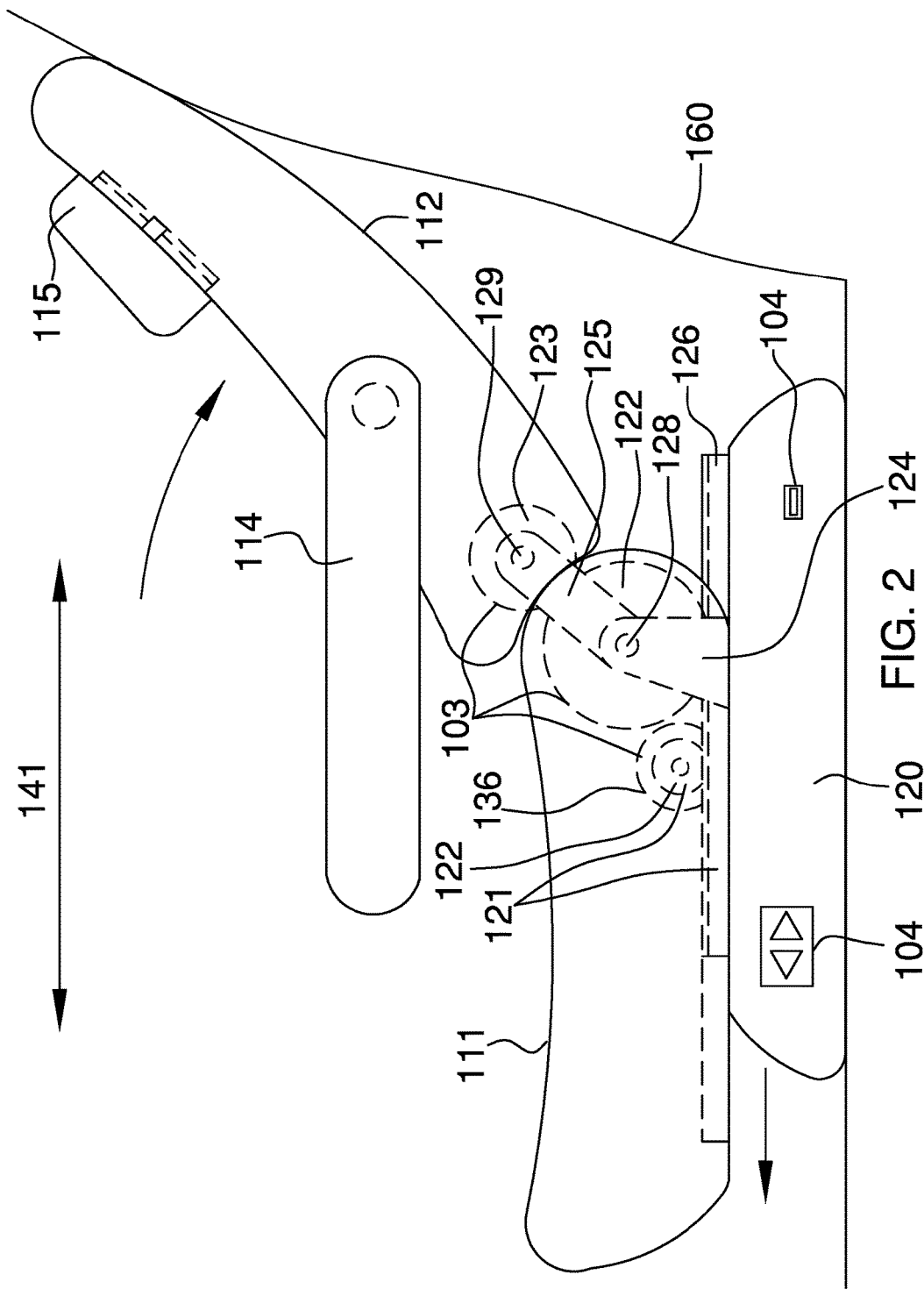
FIG. 2 is a side view of an embodiment of the disclosure.
Figure 3:
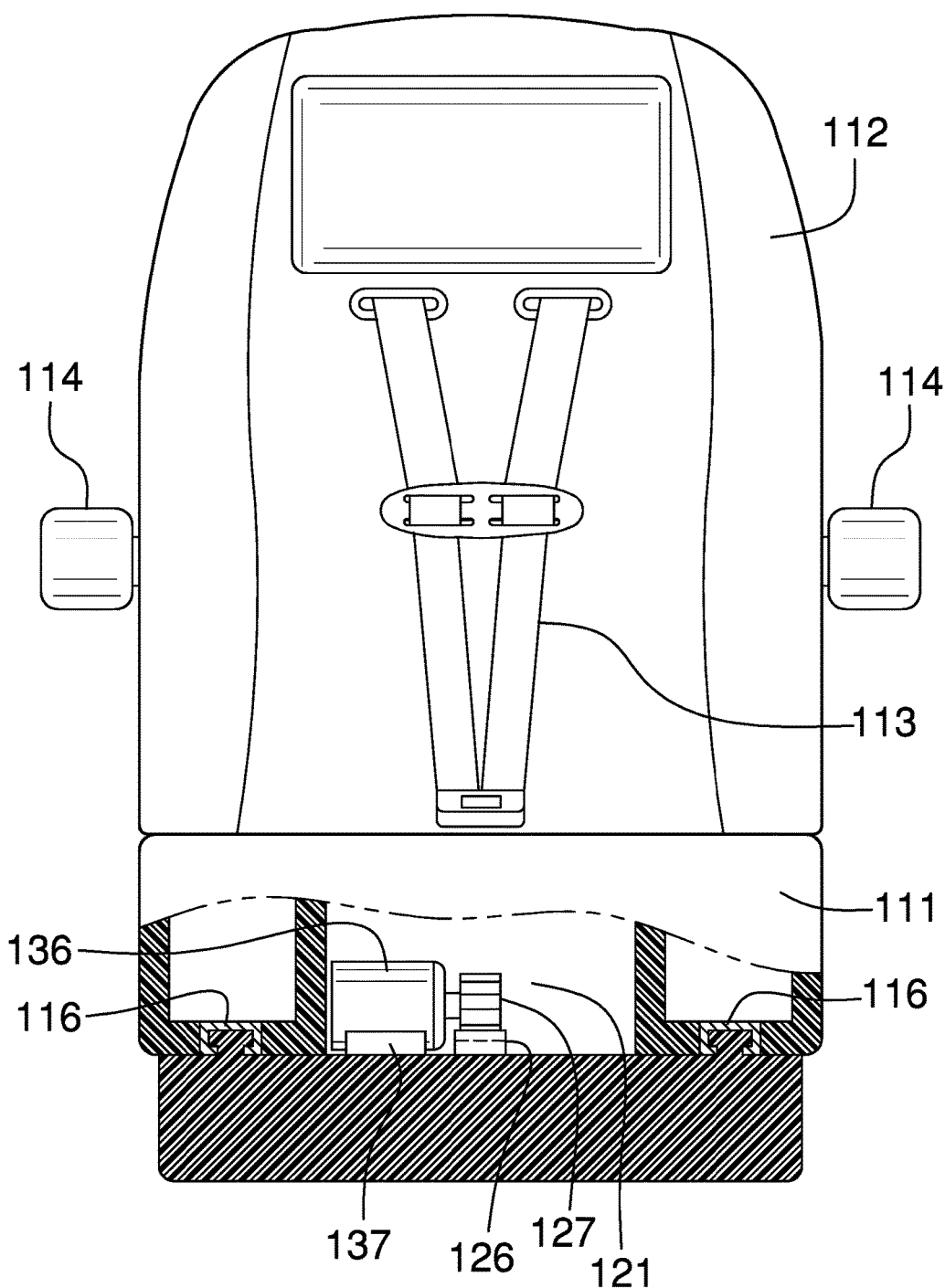
FIG. 3 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The reclining child car seat 100 (hereinafter invention) comprises a seat 101 and a reclining mechanism 102. The invention 100 is a child safety seat that is adapted for use in an automobile 160. The automobile 160 further comprises a plurality of LATCH points. The reclining mechanism 102 reclines the invention 100 in a manner that allows a child to sleep while secured within the invention 100. The reclining mechanism 102 is motor operated. The reclining mechanism 102 is remote controlled. The reclining mechanism 102 further comprises a linkage 103 and a control system 104. The linkage 103 is a structure that: 1) attaches the seat 101 of the invention 100 to the plurality of LATCH points within the automobile 160; and 2) controls the position of the seat 101 of the invention 100. The control system 104 adjusts the position of the seat 101 of the invention 100.

The seat 101 comprises a seat bottom 111, a backrest 112, a harness 113, a plurality of arm rests 114, and a headrest 115. The seat bottom 111 is the horizontal 141 surface upon which an occupant 161 sits. The backrest 112 is a supporting surface that supports the back of the occupant 161 while the occupant 161 is sitting in the seat 101. The plurality of arm rests 114 are padded struts for use by an arm 162 of the occupant 161. The headrest 115 is a padded section of the backrest 112 that supports a head 163 of the occupant 161. The harness 113 comprises a plurality of straps and fasteners that anchor the occupant 161 into the structure of the seat 101. The seat 101 is then anchored to the linkage 103. The linkage 103 is anchored using the plurality of LATCH points associated with the automobile 160 as anchor points such that the occupant 161 is firmly anchored to the frame of the automobile 160 during transit. As shown most clearly in FIGS. 4 and 8, the seat bottom 111 is attached to the linkage 103 using a plurality of T track fasteners 116.

The linkage 103 further comprises a housing 120, a rack and pinion 121, a base gear 122, a backrest gear 123, a base gear support 124, a gear arm 125, the first pivot 128 and the second pivot 129. The rack and pinion 121 further comprises a rack 126 and a pinion 127. The linkage 103 is the structure that anchors the seat 101 to the LATCH points of the automobile 160. The housing 120 is a rigid casing that is: 1) anchored to the seat 101; 2) anchored to the plurality of LATCH points of the automobile 160; and, 3) upon which the balance of the linkage 103 is mounted. The balance of the linkage 103 is used to adjust the position of the seat bottom 111 and the backrest 112 relative to the housing 120. As shown most clearly in FIGS. 1, 5, and 6, the elements of the linkage 103 other than the housing 120 (hereinafter balance of the linkage 103) are mounted on the housing 120 such that the seat 101 fits over the balance of the linkage 103.

Figure 4:
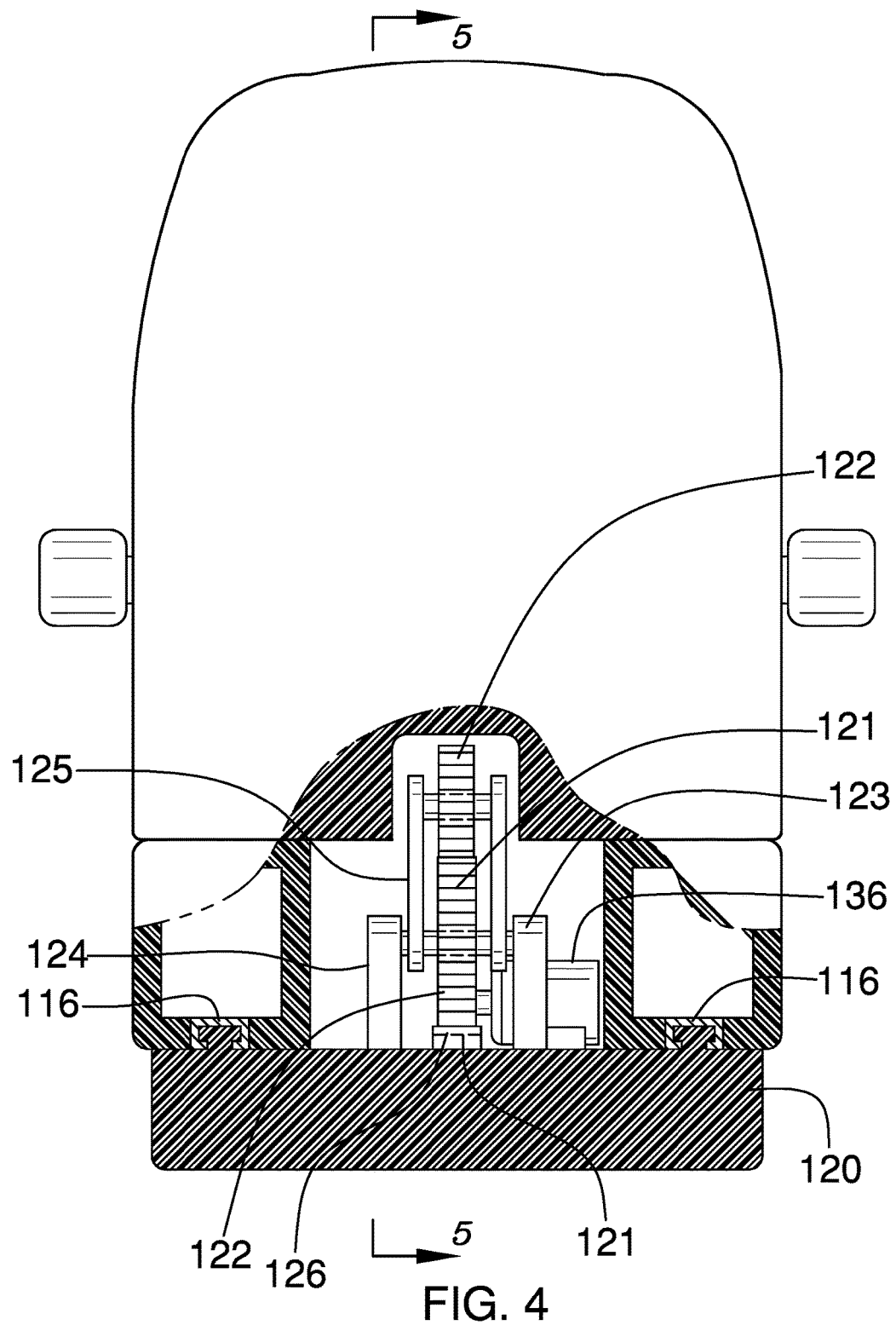
FIG. 4 is a rear view of an embodiment of the disclosure.
Figure 5:
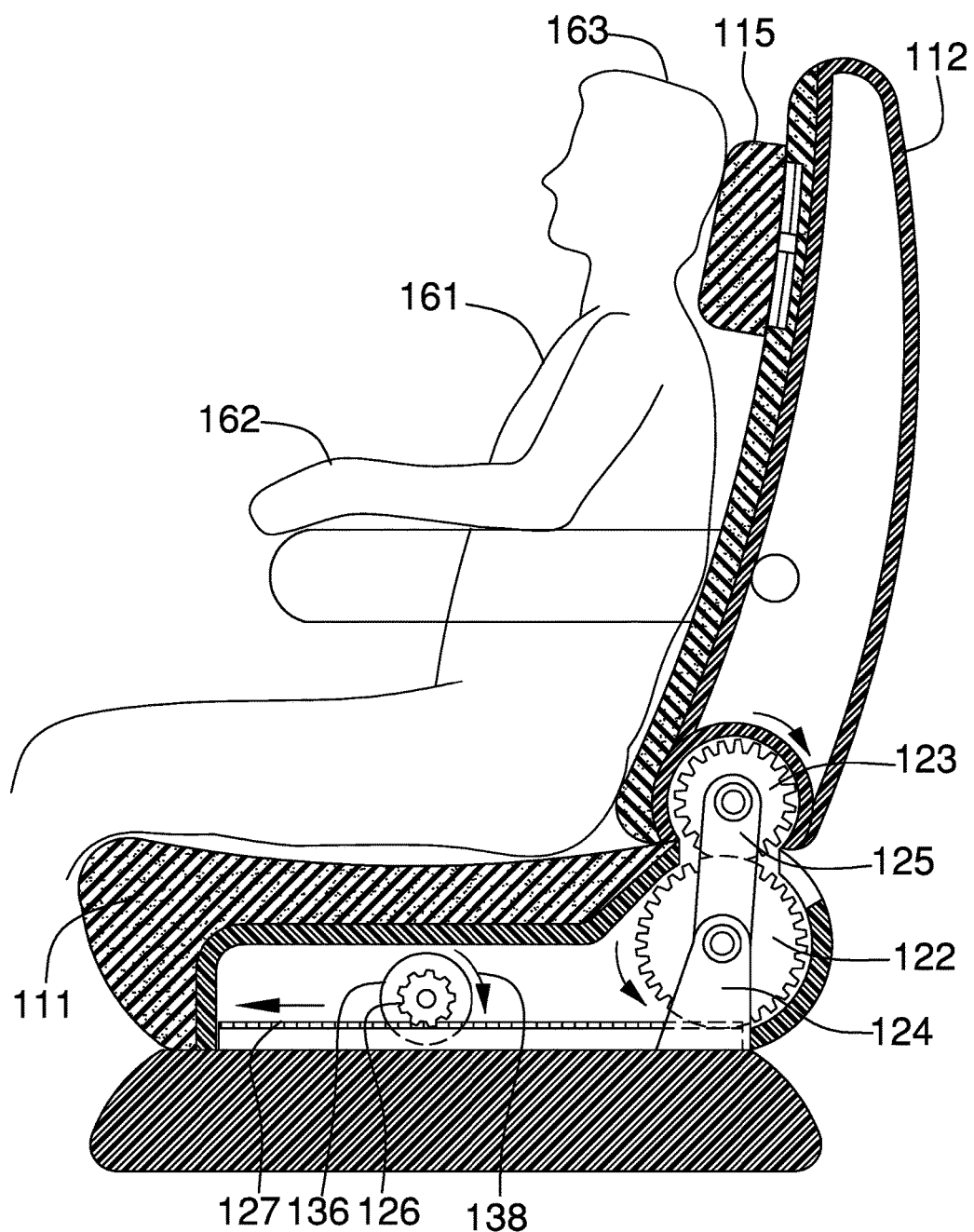
FIG. 5 is a cross-sectional view of an embodiment of the disclosure across 5-5 as shown in FIG. 4.
Figure 6:
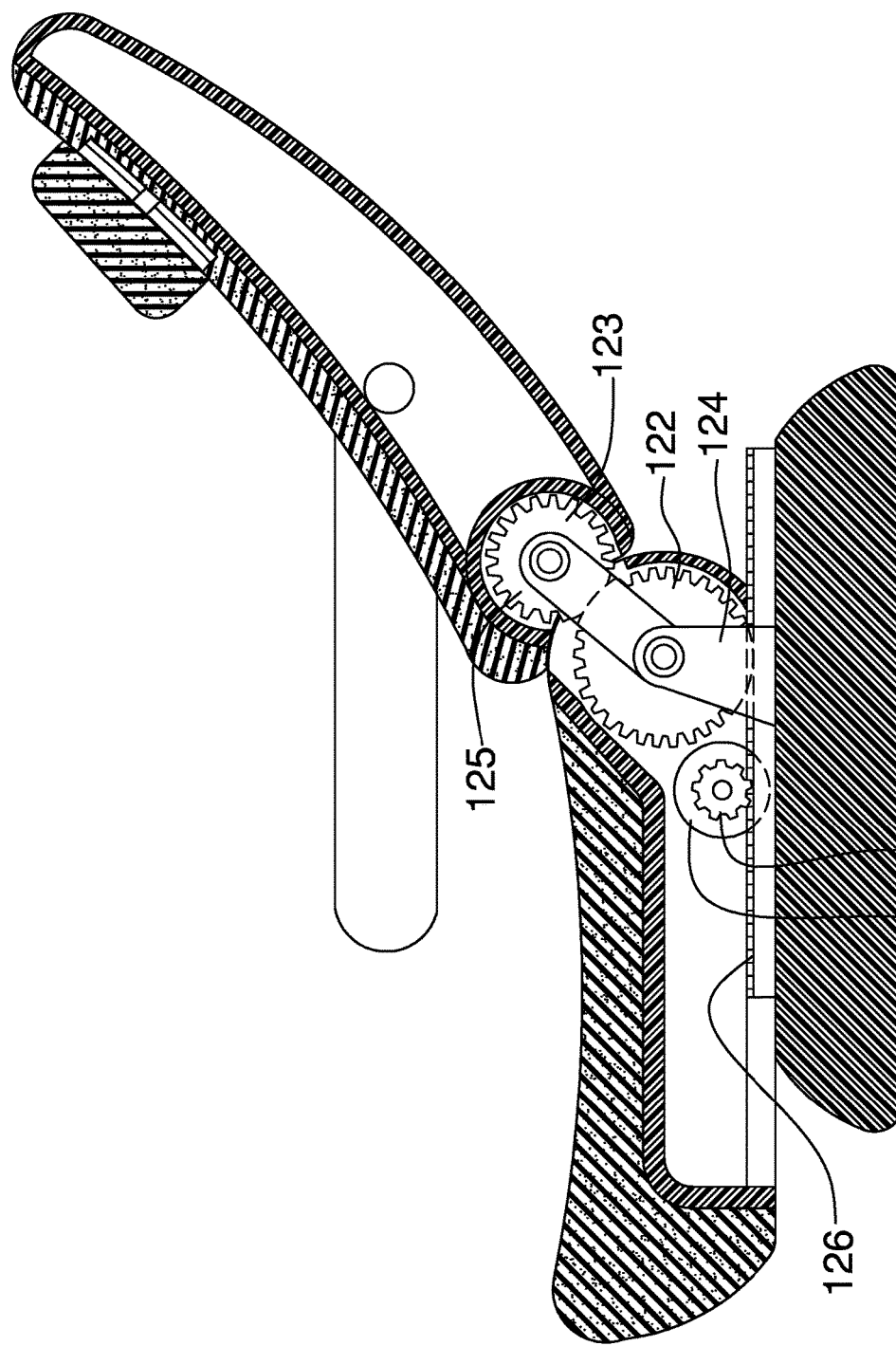
FIG. 6 is a cross-sectional view of an embodiment of the disclosure across 5-5 as shown in FIG. 4.
Figure 7:
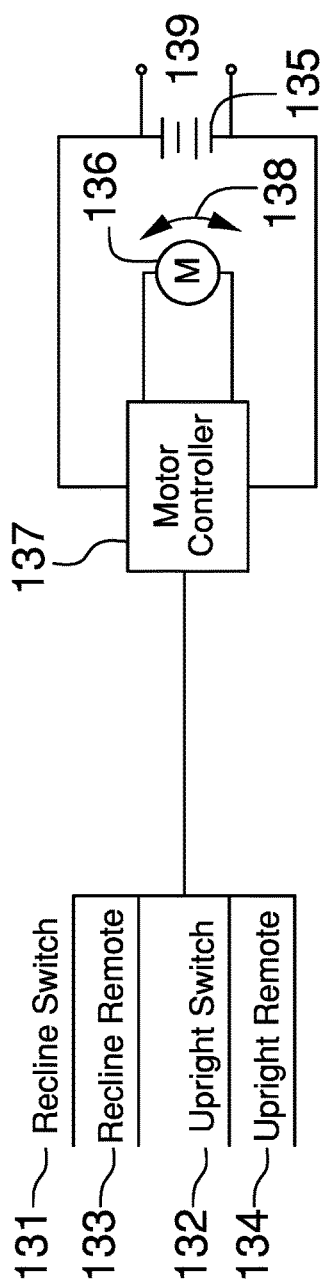
FIG. 7 is a schematic view of an embodiment of the disclosure.
Figure 8:
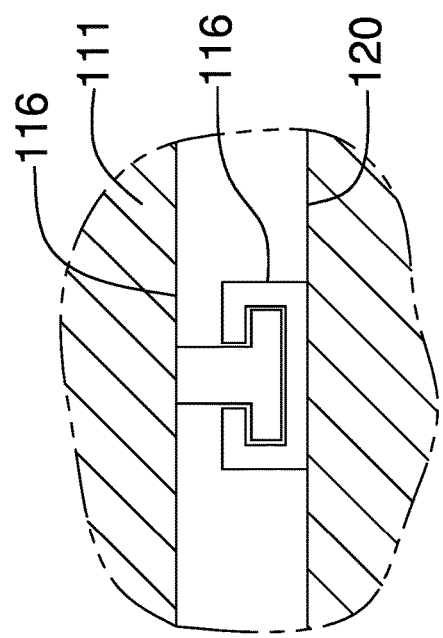
FIG. 8 is a detail view of an embodiment of the disclosure.

As shown most clearly in FIGS. 4, 5 and 6, the rack 126 is mounted on the housing 120 such that direction of motion of the rack 126 is horizontal 141. The pinion 127 is attached to the control system 104. The base gear 122 attaches to the housing 120 using the base gear support 124. The base gear support 124 is a fixed mounting that attaches the base gear 122 to the housing 120. The base gear 122 is intermeshed with the rack 126 such that when the pinion 127 rotates the resulting linear motion of the rack 126 rotates the base gear 122. The base gear 122 is further intermeshed with the backrest gear 123 such that when the base gear 122 rotates the backrest gear 123 will also rotate. The backrest gear 123 is attached to the backrest 112 using the second pivot 129. The backrest gear 123 attaches to the base gear 122 using the gear arm 125 and the first pivot 128. Within the linkage 103, the position of the pinion 127 the base gear 122, and the base gear support 124 are fixed relative to the housing 120.

The linkage 103 operates as described in this paragraph. The rotation of the pinion 127 moves the rack 126 in a linear fashion. The linear movement of the rack 126 rotates the base gear 122. As shown most clearly in FIGS. 5 and 6, the rotation of the base gear 122 changes the position of the backrest gear 123 relative to the base gear 122 such that the position of the backrest 112 relative to the horizontal 141 direction will change. This change of position of the backrest further changes the position of the seat bottom 111 relative to the housing 120. The methods and techniques necessary to build a gear system as described in this paragraph are well known and documented in the mechanical arts.

The control system 104 further comprises a first switch 131, a second switch 132, a third switch 133, a fourth switch 134, a power source 135, a motor 136, and a motor controller 137. The first switch 131, the second switch 132, the third switch 133, the fourth switch 134, the power source 135, and the motor 136 are electrically connected to the motor controller 137. The motor 136 is mounted on the housing 120.

The power source 135 is a readily and commercially available 12 Volt battery with an associated charging port 139. The power source 135 is adapted to connect to the automobile 160 power system through the charging port 139.

The motor 136 is a 12 Vdc electric motor that attaches to and is used to rotate the pinion 127. As shown most clearly in FIG. 7, the motor 136 is associated with and electrically connected to motor controller 137.

The motor controller 137 is a readily and commercially motor controller 137 that is designed to control a 12 Vdc electric motor. The motor controller 137 receives control signals from the first switch 131, the second switch 132, the third switch 133, and the fourth switch 134. The first switch 131 is a readily and commercially available single pole single throw switch that is used to provide a control signal to the motor controller 137. The first switch 131 signals the motor controller 137 to rotate 138 the motor 136 in a first direction. The second switch 132 is a readily and commercially available single pole single throw switch that is used to provide a control signal to the motor controller 137. The second switch 132 signals the motor controller 137 to rotate 138 the motor 136 in a second direction which is opposite from the first direction. The third switch 133 is a readily and commercially available single pole single throw remotely controlled switch that is used to provide a control signal to the motor controller 137. The third switch 133 signals the motor controller 137 to rotate 138 the motor 136 in the same direction as the first switch 131. The fourth switch 134 is a readily and commercially available single pole single throw remotely controlled switch that is used to provide a control signal to the motor controller 137. The fourth switch 134 signals the motor controller 137 to rotate 138 the motor 136 in the same direction as the second switch 132.

In the first potential embodiment of the disclosure, the third switch 133 and the fourth switch 134 are provisioned using a readily and commercially available product combining 433 MHz remote control switch and receiver. The use of a 2 channel of 4 channel product is preferred.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Automobile: As used in this disclosure, an automobile is a road vehicle that that specializes in carrying passengers and light cargo loads. This definition is specifically intended to include vehicles generally referred to as pickup trucks, vans, and minivans.

Battery: As used in this disclosure, a battery is a container consisting of one or more cells, in which chemical energy is converted into electricity and used as a source of power.

DC: As used in this disclosure, DC is an acronym for direct current.

Electric Motor: In this disclosure, an electric motor is a machine that converts electric energy into rotational mechanical energy.

Harness: As used in this disclosure, a harness is an apparatus comprising a plurality of straps and one or more fasteners that is used to anchor a first person or first object to a second object.

Headrest: As used in this disclosure, a headrest is a pad that attaches to or extends from the backrest of a seat.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

LATCH: As used in this disclosure, LATCH is an acronym for "Lower Anchors and Tethers for Children." The LATCH is an international standard, ISO 13216, for the design and placement of attachment points for child safety seats in passenger cars. LATCH is also referred to as LUAS (Lower Universal Anchorage System), Canfix, UCSSS (Universal Child Safety Seat System) or ISOFIX.

Motor: As used in this disclosure, a motor refers to the method of transferring energy from an external power source into mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs, which are used determine the desired rotational speed and direction of rotation of the electric motor.

Pad: As used in this disclosure, a pad is a mass of soft material used as a filling or for protection against damage or injury. Commonly used padding materials include, but are not limited to, a polyester fill often referred to as fiberfill or polystyrene beads often referred to as stuffing beans or as bean bag chair beans.

Pivot: As used in this disclosure, a pivot is a rod or shaft around which an object rotates or swings.

Rack and Pinion: As used in this disclosure, a rack and pinion is a gearing system that is designed to convert rotational energy into linear energy or the reverse. The rack is a toothed shaft that moves in a linear manner. The pinion is a gear (generally mounted on a rotating shaft) that interacts with the rack such that when the pinion rotates the rack is moved in a linear direction. Reversing the direction of rotation of the pinion will reverse the direction of the rack. Rack and pinion systems are well known and documented in the mechanical arts.

Recline: As used in this disclosure, recline refers to a person who lie backwards with the back supported. A person in such a position is said to be in a reclined position. Alternative, recline may refer to a seat or chair wherein the back of the seat is in a sloped position such that a person sitting in the seat is in a reclined position. Such a seat or chair is often referred to as a reclining chair or a reclining seat.

Remote Control: As used in this disclosure, remote control means the establishment of control of a device from a distance. Remote control is generally accomplished through the use of an electrical device that generates electrically based control signals that are transmitted via radio frequencies or other means to the device.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail is inserted into the channel.

Vdc: As used in this disclosure, Vdc is an abbreviation for direct current voltage.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A child safety seat comprising:
a seat and a reclining mechanism;
wherein the child safety seat is adapted for use in an automobile;
wherein the reclining mechanism reclines the child safety seat in a manner that allows a child to sleep while secured within the child safety seat;
wherein the reclining mechanism is motor-operated;
wherein the reclining mechanism is remote controlled;
wherein the reclining mechanism further comprises a linkage and a control system;
wherein the linkage anchors the seat to the automobile;
wherein the linkage controls the position of the seat;
wherein the control system adjusts the position of the seat;
wherein the seat comprises a seat bottom, a backrest, a harness, a plurality of arm rests, and a headrest;
wherein the plurality of arm rests and the head rest are attached to the backrest;
wherein the seat bottom and the backrest attach to each other;
wherein the harness attaches to the seat bottom and the backrest;
wherein the seat is anchored to the linkage;
wherein the linkage is anchored to the automobile;
wherein the linkage further comprises a housing, a rack, a pinion, a base gear, a backrest gear, a base gear support, a gear arm, a first pivot and the second pivot;
wherein the rack, the pinion, the base gear, the backrest gear, the base gear support, the gear arm, the first pivot and the second pivot are mounted on the housing.

2. The child safety seat according to claim 1
wherein the housing is a rigid casing;
wherein the housing is anchored to the seat;
wherein the housing is anchored to the automobile;
wherein the balance of the linkage is defined as the collection comprising the rack, the pinion, the base gear, the backrest gear, the base gear support, the gear arm, the first pivot and the second pivot.

3. The child safety seat according to claim 2 wherein the balance of the linkage mounts on the housing such that the seat fits over the balance of the linkage.

4. The child safety seat according to claim 3 wherein the rack is mounted on the housing such that direction of motion of the rack is horizontal.

5. The child safety seat according to claim 4 wherein the pinion is attached to the control system.

6. The child safety seat according to claim 5
wherein the base gear attaches to the base gear support;

wherein the base gear support is a fixed mounting that attaches the base gear to the housing.

7. The child safety seat according to claim 6 wherein the base gear is intermeshed with the rack such that when the pinion rotates the resulting linear motion of the rack rotates the base gear.

8. The child safety seat according to claim 7 wherein the base gear is further intermeshed with the backrest gear such that when the base gear rotates the backrest gear will also rotate.

9. The child safety seat according to claim 8
wherein the backrest gear is attached to the backrest using the second pivot; and
wherein the backrest gear attaches to the base gear using the gear arm and the first pivot.

10. The child safety seat according to claim 9 wherein the position of the pinion the base gear, and the base gear support are fixed relative to the housing.

11. The child safety seat according to claim 10
wherein the control system further comprises a first switch, a second switch, a third switch, a fourth switch, a power source, a motor, and a motor controller;
wherein the first switch, the second switch, the third switch, the fourth switch, the power source, and the motor are electrically connected to the motor controller.

12. The child safety seat according to claim 11
wherein the motor is mounted on the housing;
wherein the motor is a 12 Vdc electric motor that attaches to and is used to rotate the pinion.

13. The child safety seat according to claim 12
wherein the motor controller receives control signals from the first switch, the second switch, the third switch, and the fourth switch;
wherein the first switch is a single pole single throw switch;
wherein the second switch is a single pole single throw switch;
wherein the third switch is a single pole single throw remotely controlled switch;
wherein the fourth switch is a single pole single throw remotely controlled switch.

14. The child safety seat according to claim 13 wherein the power source is a 12 volt battery with an associated charging port.

15. The child safety seat according to claim 14 wherein the seat bottom attaches to the linkage using a plurality of T track fasteners.

* * * * *